Patented Mar. 9, 1943

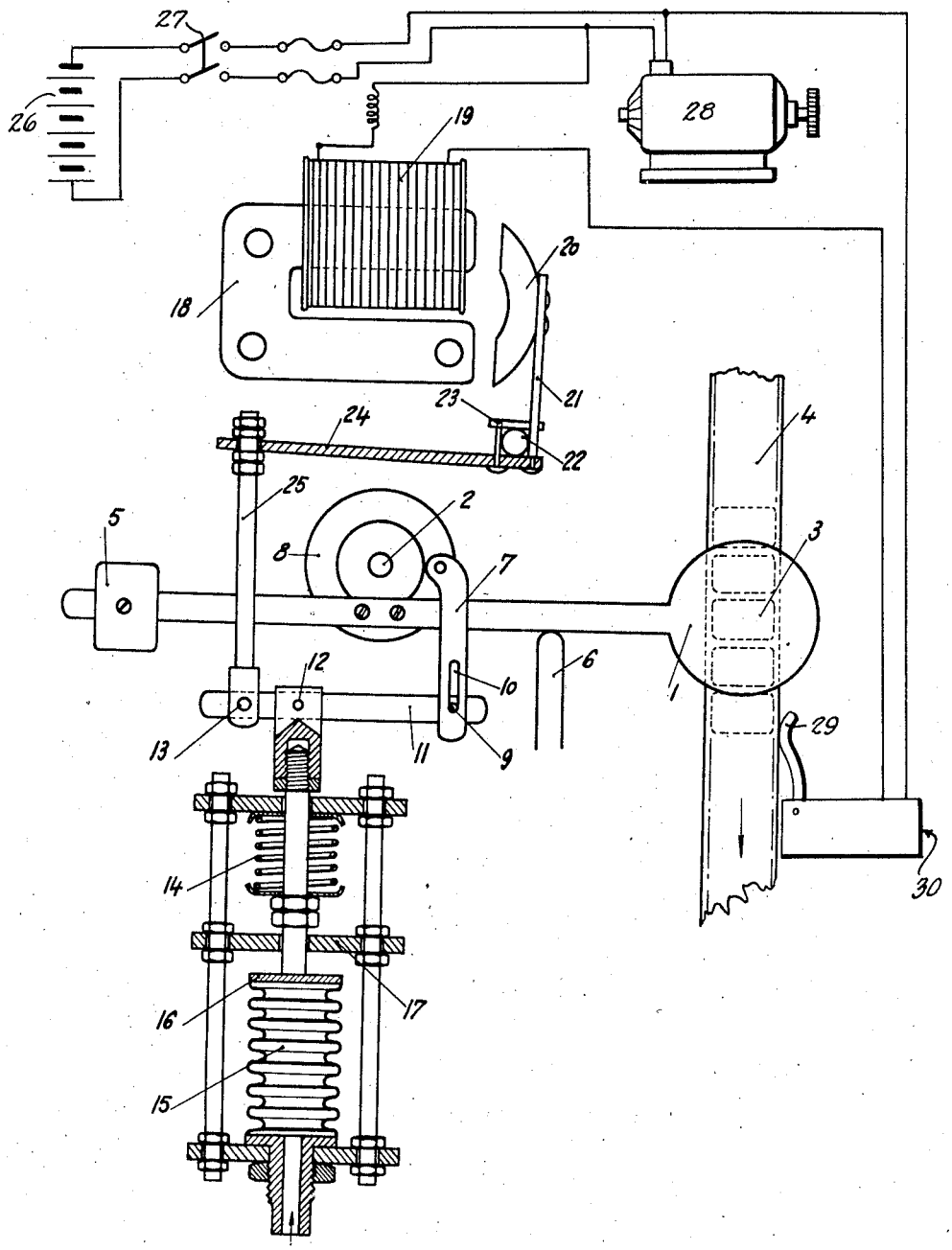

2,313,299

UNITED STATES PATENT OFFICE 2,313,299

SAFETY DEVICE AGAINST FIRE FOR CINEMATOGRAPHIC PROJECTORS

Frédéric Mathieu, Paris, France; vested in the Alien Property Custodian

Application April 9, 1940, Serial No. 328,683
In France May 13, 1939

2 Claims. (Cl. 88—17)

This invention relates to the construction and the method of operating the safety shutters of cinematographic projectors.

It has for its object to provide an improvement therein which will increase the safety from fire.

According to the invention, a safety shutter system for a cinematographic projector, for ensuring against fire, comprises a shutter which normally occupies an inoperative position clear of the light beam of the projector but which is movable thereinto so as to intercept the beam between the source thereof and the film whenever either a slowing down of the projector mechanism should take place or a stoppage or rupture of the film should occur, the said shutter being operatively connected to two independent control devices, one responsive to changes in the rate of operation of the projector mechanism and the other responsive to failures in the feed of the film, and the arrangement being such that the shutter is held in the inoperative position only as the result of the combined effect of these devices.

The control device that is responsive to changes in the rate of operation of the projector mechanism may be a fluid-pressure operated device under the control of the pressure of the cooling oil of the projector mechanism and the other control device may be an electro-magnetic device operated by the current supplying the film feeding mechanism of the projector.

It is to be understood, however, that any other form, mechanical, hydraulic (i. e. fluid-pressure operated) or electrical, of either of the control devices may be employed. For example, although in the case of a hydraulic device, the operating fluid may be the actual oil of the cooling system of the projector mechanism, it may, if desired, be any other fluid, for instance glycerine, to which the pressure of this oil is transmitted.

The invention will now be described in a more detailed manner, in the case of a dual oil-magnetic control, with reference to the accompanying drawing which shows diagrammatically by way of non-restrictive example, one particular method of construction.

In this figure, there is shown a safety shutter 1, carried by a part 8 itself movable about a fixed axis 2. The shutter is shown in the operative (safety) position, that is to say, in the position in which it covers the projection aperture 3 behind which moves, from above downward, a film 4. The whole of the weight of the shutter and of the rod which carries it is approximately counterbalanced by a counterweight 5. A stop 6 exactly fixes the position of rest. In this position, the shutter intercepts the light beam coming from the source of light which is presumed to be in front of the figure.

According to a preferred embodiment of the invention, the shutter 1 is constructed in the form of a slightly concave shell in rustless steel, polished like a mirror, the concavity of which is directed towards the source of light. This arrangement has for its object to avoid an excessive heating of the shutter under the action of the light beam, which it reflects towards the source at the same time that it sends toward this the greater part of the heat impinging upon it. Its concave shape furthermore ensures to it a greater rigidity.

When the required conditions of safety are satisfied, the shutter 1 will move upward under the action of a connecting rod 7 so as to uncover the aperture 3. The connecting rod 7 is actuated by a pivot 9 which slides between the two extremities of an elongated slot 10. The pivot 9 is itself carried by a rod 11 comprising two other pivots 12, 13 which are in line with the pivot 9.

The pivot 12 and the pivot 13 are each subjected to the independent action of one of two control devices, the combined effect of which will act, as will hereinafter appear, on the shutter 1 through the intermediary of the connecting rod 7.

The pivot 12 receives vertical thrust arising from the difference of action of a spring 14 and an oil manometric capsule 15, mounted for example upon the outlet of the lubricating pump of the projector mechanism.

As is known, the oil pressure is lessened if the pump slows down, that is to say, if the mechanism tends to stop. The spring 14 then overcomes the capsule 15 and the pivot 12 tends to descend, carrying with it in its movement the connecting rod 7 and the shutter 1, towards the safety position, which is on the stop 6. If on the contrary, the mechanism takes up its normal speed, the capsule 15 overcomes the spring 14 and the pivot 12 rises until an upper plate 16 of the capsule comes into contact with an adjustable stop 17, which limits its upward movement. This stop is regulated so as to act at the moment when the pivot 9, having traversed the slot 10 of the connecting rod 7, will tend to thrust the latter upward and raise the shutter 1. In this movement, the rod 11 rotates about the pivot 13, which is assumed to be fixed.

Now this pivot 13 is subjected on the other hand, in accordance with the invention, to the independent action of a second control device, for example an electro-magnetic device such as that shown on the figure. In the latter, an electromagnet 18 having a coil 19 attracts, when the current is established, an armature 20 carried by a member 21 movable about a pivot 22. There is also movable about this pivot, but rigid with the member 21, an arm 24 which is raised when the armature moves away from the electro-magnet, and conversely.

The arm 24 carries with it in its movement the pivot 13 through the intermediary of a rod 25. Two systems of nut and lock nut permit the position of the pivot 13 to be regulated with respect to that of the armature 20. The parts are so set, moreover, that the arm 24 has a certain amount of play with respect to the rod 25 so as to afford to it freedom for a slight degree of free angular displacement.

To make the figure clearer, the armature 20 has been shown in the position where it is spaced away from the electro-magnet 18.

Actually, however, the weight of the parts that are hinged about the pivot 22 tends to keep the armature in contact even in the absence of current and it does not in practice assume the position shown unless the current has just failed, even if the pressure of oil remains in the capsule 15.

In this case, as has been explained above, the pivot 12 being in its highest position the pivot 9 comes to the top of the slot 10 and the shutter does not rise.

In this position it is actually the weight of the shutter 3, not quite counterbalanced by the counterweight 5, which carries it against the weight of the parts 24, 25 and which causes the movement of the armature 20 away from the magnet 18.

If, on the contrary, the current is established in the coil 19 when switch 27 is closed which supplies power to a driving motor 28, the armature 20 again takes up its attracted position and the pivot 13 descends. If then there is no pressure of oil at the capsule 15, that is to say, if the pivot 12 is in the position in which it appears in the drawing, the rod 11 will pivot about the point 12 and the pivot 9 will simply rise in the slot 10. The apparatus is regulated in such manner that the pivot 9 then reaches the top of the slot 10, but does not raise the shutter. The latter consequently still remains closed.

In consequence of the play given by the slot 10, the shutter will only rise if simultaneously there is current in the coil 19, that is to say, if both the armature adheres and there is the normal pressure of oil at the capsule 15.

There is thus provided a double safety system as has been desired, for in practice, the safety which is ensured by the pressure of oil in the lubricating pump of the projector mechanism is, in effect, duplicated by the operation of an electric safety device which will cause the shutter to drop again or will prevent it from rising in cases where, with continued rotation of the lubricating pump, the film is lacking or (which would be more serious) has become fixed in the apparatus, for example through rupture of the film or destruction of the perforations.

To cause the shutter immediately to drop in these latter cases, it will be sufficient, for example, to arrange in the path of the film, below the projection aperture, a movably mounted finger 29 normally resting on the underside or other portion of the film and controlling an electric switch 30, or a roller normally driven by the film alone and having a switch acting by centrifugal force (for example, a spring system with contact ensured by mercury) and arranged in series with the coil 19 of the electro-magnet.

The current which supplies this coil will be taken preferably, not directly from the mains, but at the terminals themselves of the motor which drives the projector mechanism, that is to say, beyond the switch which starts the latter and its fuses and the like.

Thus, the bursting of a fuse or the undesired opening of the motor switch would also automatically cut off the supply of current of the coil 19 and cause the safety shutter immediately to drop.

This action thus duplicates, as above described, the safety given by the lack of pressure of the lubricating oil. It has furthermore the advantage of being very rapid.

The supplementary safety circuit constituted by the coil 19 might also be utilised in installations comprising two projectors so as to ensure, without possibility of accident, the rapid passage from one projector to the other (running on at the end of a film bobbin).

What I claim as my invention and desire to secure by Letters Patent of the United States is:

1. A safety shutter system for preventing film fires in a cinematographic projector having a movable shutter capable of moving to and from an effective obscuring position in the path of a light beam illuminating a film being fed through said projector, a lever connected at one end with a portion upon said shutter, lever means pivotally connected at one end to the other end of said first mentioned lever and having a magnet armature secured to the other end, a pivotal mounting for said lever means, an electromagnet disposed adjacent to said armature, an electric driving motor for said projector, a switch means having a circuit including said electromagnet, a finger normally resting on the film when normally in tensed position in the projector and capable of closing the circuit when the film slacks, breaks or is absent from the vicinity of said finger, a hydraulic device operated by the cooling oil of the projector mechanism and being responsive to loss of speed or stoppage of said mechanism, and a movable operating member pivotally connected to a portion of said first mentioned lever between the ends or other two pivotal connections thereon, said movable operating member being actuated by and forming part of said hydraulic device.

2. A safety shutter system according to claim 1, having a pivoted member supporting the shutter and a link member pivoted at one end to said pivoted member and having the other end slotted longitudinally of said link member, and a pivot pin upon the first mentioned lever engaging in the slotted end of the link member, said link member forming together with the pivoted member the means connecting the lever with the shutter.

FRÉDÉRIC MATHIEU.